Dec. 14, 1937.    F. H. SCANTLEBURY    2,102,384

ILLUMINATED MEASURING DEVICE

Original Filed March 10, 1932

INVENTOR.
FRANCIS H. SCANTLEBURY
BY
ATTORNEY.

Patented Dec. 14, 1937

2,102,384

UNITED STATES PATENT OFFICE 2,102,384

ILLUMINATED MEASURING DEVICE

Francis H. Scantlebury, Brooklyn, N. Y.

Original application March 10, 1932, Serial No. 598,004. Divided and this application July 18, 1935, Serial No. 32,068

9 Claims. (Cl. 240—2.1)

The invention relates to illuminated devices, as of the edge-lighted or back-lighted type and embodying one or more sheets of transparent glass or other transparent or translucent or perforated opaque material bearing suitable designs or configurations, a part of which, at least, is constituted by subdivisions for association with an element caused to move relatively thereto. The said configurations may be illuminated by refracted light entering one or more edges of the glass, or by light directed therethrough from the rear of said plate.

The invention, for example, may embody illuminated time pieces, measuring apparatus, etc., and is especially adaptable to synchronous electric motor operated time pieces wherein the power for effecting the operation of the time piece may also serve to provide the desired illumination.

The present application is a division of U. S. Letters Patent No. 2,009,210, granted me the 23rd day of July, 1935.

The invention has for an object to effectively associate illuminated configurations of a dial or like plate with a movable member or members and in a manner such that these will also be clearly visible when the dial member is illuminated, making the device particularly suitable for use in darkened surroundings, as well as in daylight when the device is not illuminated.

A further object of the invention resides in a simple and inexpensive construction which may readily be adapted, for example, to time pieces of standard construction, and particularly to electrically operated time pieces.

In carrying out the invention, one or more transparent plates of glass or other transparent or translucent, or perforated opaque, material serves to close in whole or in part the front of a suitable case or cabinet for housing the driving mechanism of the movable member or members to be associated with suitable configurations or divisions provided upon said plate or plates and constituting the dial therefor. These configurations may be provided for and illuminated in the case of glass, for example, substantially in the manner more particularly set forth in a prior U. S. Letters Patent #1,707,965, granted to me the 2nd day of April, 1929; or they may be outlined on a plate or provided by stencil cuttings or perforations therein.

Associated with the configurations is a background member or field before which is adapted to operate the movable element or elements; and a shaft or arbor for moving the same is then arranged to project through the background member, which latter is afforded by depressing the central portion of the configuration-bearing plate.

Provision is also made, as through a lamp or lamps located in the case, whereby to illuminate simultaneously the configurations as well as the moving element and background, which latter are provided in contrasting colors or preferably as a dark and a light element, respectively, so that the said movable element or elements will be prominently displayed against the illuminated background and will always be clearly visible.

The nature of the invention, however, will best be understood when described in connection with the accompanying drawing, in which.

Figure 1:
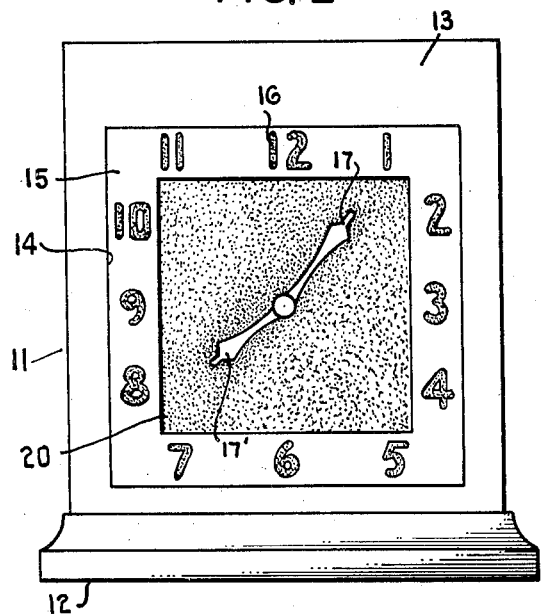
Fig. 1 is a front elevation of the novel illuminated device as embodied in a clock.
Figure 2:
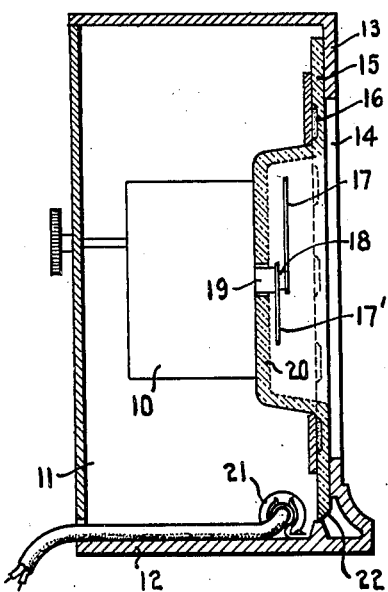
Fig. 2 is a vertical section through the device.

Referring to the drawing, the invention is illustrated as embodied in a time piece, more particularly of the synchronous electric motor operated type, although the invention is not to be understood as being restricted to clocks of this type, as the ordinary spring-operated clock may also be employed, particularly where alternating current is not available. Also, the invention is applicable to other measuring apparatus embodying a scale or the like and a member movable in relation thereto.

The entire mechanism, including the motor 10, is shown as housed within a suitable cabinet or the like 11 mounted upon a base 12. The front wall 13 of the cabinet is provided with an aperture 14 to expose the face or dial of the clock, said opening in the present instance being square, but, of course, the particular design of the opening may be varied as desired.

Through this aperture 14 is visible a dial plate 15 carrying the desired design or configurations such as the time subdivisions or numerals 16 and any other ornamentation or the like as may be desired. Through the central portion of this dial and the aperture 14 are also visible the hands 17 and 17' of the clock, the same being mounted upon arbors 18 and 19 driven from the clock motor 10 in the usual manner.

The dial 15 is in the nature of a plate which serves to close the front portion of the housing and in the present embodiment consists of a centrally depressed transparent plate of glass in the flange of which the configurations 16 are etched as by sand-blasting or the like, and as is more particularly set forth in my aforesaid prior U. S. Letters Patent, to provide the desired design. The central depressed portion 20 affords a background or field before which the hands 17, 17' move in juxtaposition to the configurations 16.

These hands 17, 17' then rotate within the bowl portion, and the background or bottom 20 may be illuminated by light directed through the sides, while the configurations may be similarly illuminated by light placed behind the same or, preferably, by edge-illuminating the same as well as the bottom 20. To this end a lamp 21 may be provided in proximity to the flanged portion for directing light therethrough to the configurations 16 etched therein, the edge being preferably beveled to this end as indicated at 22.

The lamp, at the same time, will transmit light through the side wall and bottom edge so that the bottom itself, especially if etched, will be illuminated and provide a satisfactory and illuminated background contrasting with the hands 17, 17'.

Moreover, the sides may also be etched or they may be entirely covered by an opaque paint or other material so that only the bottom and the configurations will be illuminated. This presents a very effective arrangement and may be also inexpensively constructed.

Figure 3:
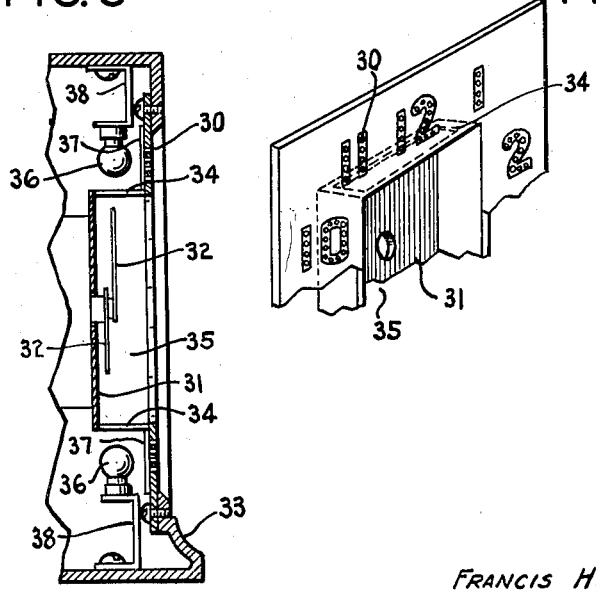
Figs. 3 and 4 are fragmentary views respectively in vertical section and in perspective and illustrate a modification.
Figure 4:
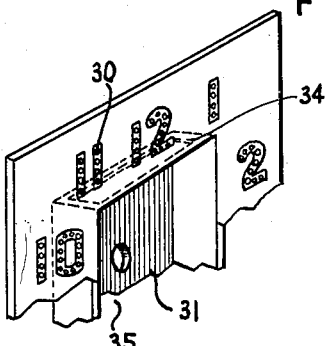

A simplified form of the novel device is indicated in Figs. 3 and 4 of the drawing wherein the configuration-bearing plate and background member are also constituted as a unit but are of opaque material such as metal. The configurations are then provided by stencilling or perforating the metal, for example, in the provision of the perforations 30. As the central portion of the configuration-bearing plate is displaced rearwardly to afford the background 31, the hands 32 will be visible from the front of the cabinet 33. Slots 34 are provided in the top and bottom, respectively, of the displaced portion to admit light into the light chamber 35 for illumination of the background plate 31 and hands 32 from lamps 36.

These lamps are located also immediately behind the perforations 30 to direct light therethrough, it being preferable to utilize perforations rather than stencils as the latter would generally transmit an undesirable amount of light. If it be desired to have these configurations in color, an annular color screen member 37 may be located between lamps 36 and the perforations 30. The said lamps are attached, for example, to the top and bottom of the cabinet by brackets 38, and the entire structure may be inexpensively provided and is conveniently installed in a cabinet or the like.

I claim:

1. An illuminated device, comprising a dished member of glass with flange, the flange having etched configurations with opaque backing and the bottom of the dished member being etched to afford a background and being perforated to pass therethrough a driving element, an element movable by said driving element before the background and in juxtaposition to the configurations and contrasting with said background, and means invisible from the front of the device to illuminate the background and to edge-illuminate the configurations.

2. An illuminated device, comprising a dished member of glass with flange, the flange having etched configurations with opaque backing and the bottom being etched to afford a background and being perforated to pass therethrough a driving element, an element movable by said driving element before the background and in juxtaposition to the configurations and contrasting with said background, and means invisible from the front of the device to edge-illuminate the configurations and the background.

3. An illuminated device, comprising a dished member of glass with flange, the flange having etched configurations with opaque backing and the sides being etched and also the bottom of the dished member, the latter to afford a background and being perforated to pass therethrough a driving element, an element movable by said driving element before the background and in juxtaposition to the configurations and contrasting with said background, and means invisible from the front of the device to edge-illuminate the configurations, sides and background.

4. An illuminated device, comprising a light-transmitting element bearing marginal configurations and having a central depressed portion affording a background in a plane substantially parallel therewith, an opaque washer fitting over the depressed portion immediately behind the configurations, an element movable within said depressed portion in juxtaposition to the configurations, a source of light invisible from the front of the device, part passing into the light-transmitting element through an edge thereof to illuminate the configurations and other rays through one or more of the wall portions surrounding the depressed portion to illuminate the background.

5. An illuminated device, comprising a dished member with flange, the flange being provided with illuminable configurations and the bottom of the dished member affording a background and being perforated to pass therethrough a driving element, an element movable by the driving element before said background and in juxtaposition to the configurations and contrasting in color with the background, and illuminating means invisible from the front of the device and located therein between the rear of the device and the plane of the flange, part of the light rays from said illuminating means illuminating solely said configurations and others therefrom illuminating said background.

6. An illuminated device, comprising a dished member with flange, the flange being provided with light-transmitting configurations and the bottom of the dished member affording a background and being perforated to pass therethrough a driving element, an element movable by the driving element before said background and in juxtaposition to the configurations and contrasting in color with the background, and illuminating means invisible from the front of the device and located therein between the rear of the device and the plane of the flange, part of the light rays from said illuminating means passing through and illuminating solely said configurations and others therefrom illuminating said background.

7. An illuminated device, comprising a dished member with flange, the flange being provided with light-transmitting configurations and the bottom of the dished member affording a background and being perforated to pass therethrough a driving element, the side of the dished portion being slotted, an element movable by the driving element before said background and in juxtaposition to the configurations and contrasting in color with the background, and illuminating means invisible from the front of the device and located therein between the rear of the device and the plane of the flange, part of the light rays from said illuminating means passing through and illuminating solely said configurations and others therefrom through the slot of the member to illuminate said background.

8. An illuminated device, comprising a light-transmitting dished member with flange, the flange carrying illuminable configurations and the bottom of the dished member affording a background and being perforated to pass therethrough a driving element, an element movable by the driving element before said background and in juxtaposition to the configurations and contrasting in color with the background, and illuminating means invisible from the front of the device and located therein between the rear of the device and the plane of the flange, an edge of the flange being exposed to part of the light rays from said source to edge-illuminate said configurations and others therefrom illuminating said background.

9. An illuminated device, comprising a flanged plate having a central depressed portion affording a light chamber and a background, the flange being provided with illuminable configurations, an element movable before the background and contrasting in color therewith, and illuminating means invisible from the front of the device and located therein between the rear of the device and the plane of the flange such that part of the light rays from said source illuminate solely the configurations and other therefrom illuminate the light chamber.

FRANCIS H. SCANTLEBURY.